Patented Nov. 25, 1952

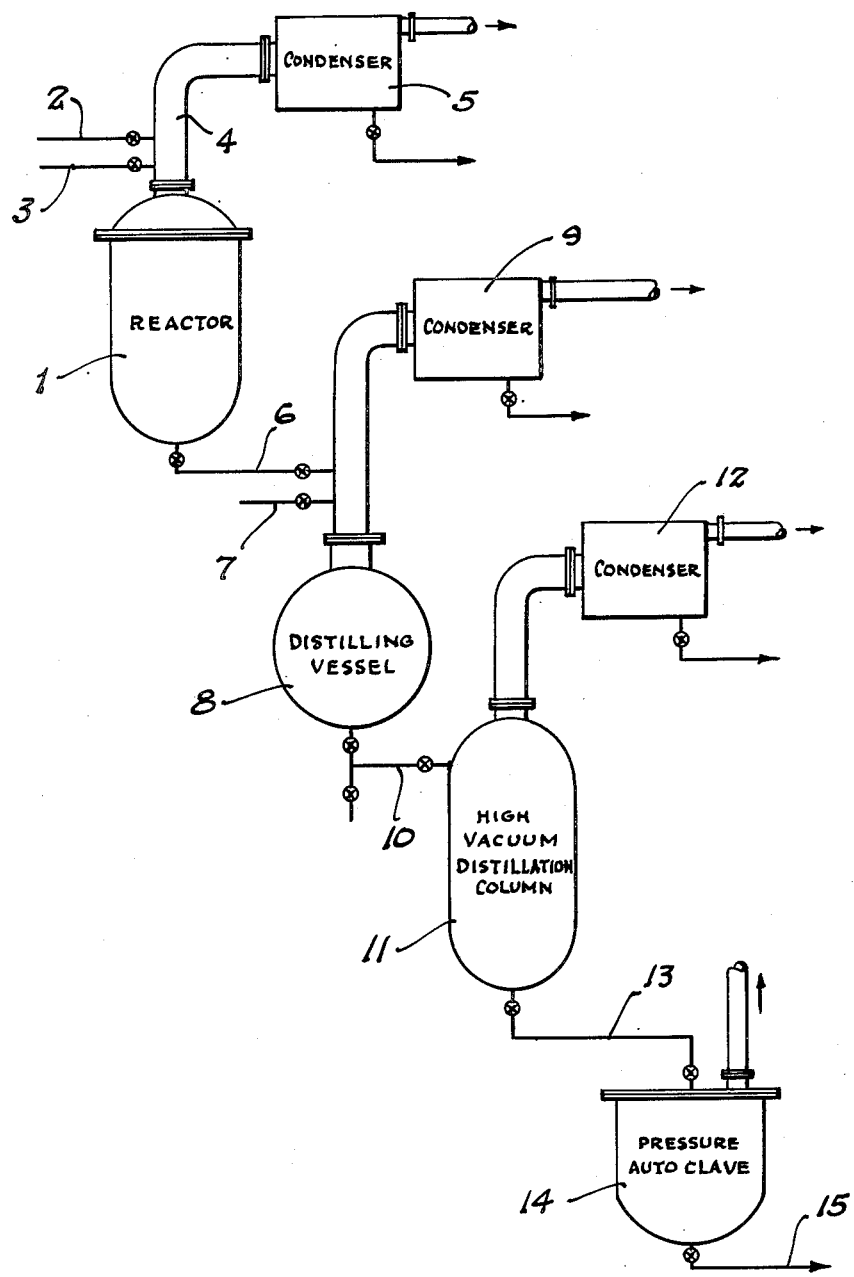

2,619,493

UNITED STATES PATENT OFFICE 2,619,493

MONOGLYCERIDES

Frank A. Norris, Chicago, Ill., assignor to Swift & Company, Chicago, Ill., a corporation of Illinois Application June 12, 1950, Serial No. 167,685

16 Claims. (Cl. 260—410.7)

1

The present invention relates generally to the preparation of the esters of polyhydric alcohols and more particularly to a process of preparing monoglycerides substantially uncontaminated with di- and triglycerides.

The increasing use of partial glycerides as emulsifying agents and for other industrial uses has greatly increased their importance. Since monoglycerides are largely responsible for the beneficial effects obtained, a process which will produce substantially pure monoglycerides, uncontaminated with di- and triglycerides, has long been sought.

The conventional commercial method of producing fatty acid monoglycerides by the simple esterification of glycerin with higher molecular weight fatty acids has resulted in a relatively low yield of the desired monoglyceride. Improvements have been suggested to increase the monoglyceride yield by the use of a solvent, such as phenol, or by careful control of the amount of acid used. Various catalysts, both acid- and alkali-reacting, have been proposed for use in the esterification of glycerin with a fatty acid to increase the monoglyceride yield. While these suggested improvements have increased to some extent the yield of the desired monoglycerides, they have failed on a commercial scale to provide a substantially pure monoglyceride, since the products so formed contain about 65 per cent of the undesirable di- and tri-glycerides. In contrast to the efforts of the prior art, the method of this invention results in the production of monoglycerides which are 90—99 per cent pure.

The principal object of the present invention is to prepare monoglycerides substantially uncontaminated with di- and tri-glycerides.

Other objects, if not specifically pointed out herein, will be apparent to one skilled in the art from the following detailed description of this invention.

The term "oxo-carbonyl compound" as hereinafter used denotes a compound having a carbonyl (C=O) bonded to hydrogen and/or carbon and is a term generic to aldehydes and ketones.

Referring to the drawing, Fig. 1 represents a diagrammatic flow sheet of the process, illustrating one type of apparatus set-up in which the process of this invention may be carried out.

2

Glycerin and an "oxo-carbonyl compound" are passed through supply lines 2 and 3 respectively, into a reactor 1, said reactor being connected with a condenser 5 and a suitable source of vacuum (not shown) through line 4. Within the reactor 1, the hydroxyl groups of the glycerin are "blocked-off" by the oxo-carbonyl compound as illustrated in the equations below. The "blocked" glycerin then passes into a distilling vessel 8 through line 6. A suitable quantity of esterifying agent, preferably an alkyl ester of a fatty acid, is also added to vessel 8 through line 7. Heat is applied and as a result of the olcoholysis reaction the fatty acid radical attaches to the unblocked hydroxyl group of the glycerin, the alcohol produced being distilled off and collected from vacuum condenser 9. The resulting ester of the "blocked" glycerin derivative is then purified by a high vacuum short distillation step in column 11, the said ester entering the distillation column through line 10. This column is equipped, in a like manner to the previously mentioned vessels, with a vacuum condenser 12. The high vacuum distillation is carried out at a temperature 218° C. and at about 3 mm. pressure. This step, contrary to the general conception that distillation of monoesters is impossible or impractical due to decomposition or the formation of undesirable side reactants, when performed on a monoester having the two unreacted hydroxyl groups "blocked" as disclosed herein produces a compound of high purity. The resulting purified ester is then passed from the said distillation column 11 through line 13 to a pressure autoclave 14 wherein the "unblocking" of the said purified ester takes place, freeing the "blocked" hydroxyl groups of the ester and forming a substantially pure monoglyceride.

The sequence of steps is indicated by the following equations wherein R is a relatively short chain hydrocarbon, the symbol

represents an oxo-carbonyl compound, and the symbol

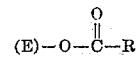

represents an esterification agent comprising a low molecular weight ester of a fatty acid.

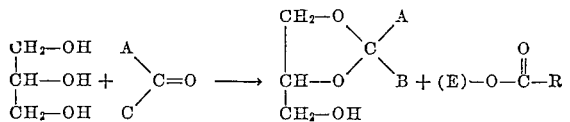

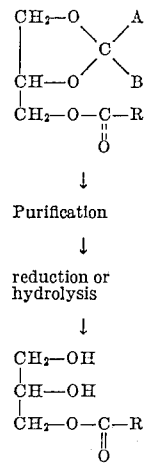

The present invention can be carried out in several ways; for example, the hydroxyl groups of the glycerin may be blocked by reaction with a suitable aldehyde such as formaldehyde, acetaldehyde, benzaldehyde, or they may be blocked by reaction with a suitable ketone, such as acetone, diethyl ketone, or dipropyl ketone. The free hydroxyl group may be esterified by direct esterification with a fatty acid, or preferably by alcoholysis between an alkyl ester of a fatty acid and the blocked glycerin in the presence of a suitable catalyst, such as the soap of a fatty acid. A preferred catalyst is formed by the addition of lead oxide to the mixture, the said lead oxide combining with part of the fatty acid present to form relatively insoluble lead soaps. These lead soaps act as the catalyst. It is desirable to employ relatively insoluble soaps, since they remain behind and do not complicate the purification step. The purification step is considered to form an important part of the present invention as mentioned in the foregoing description of the process and apparatus. This step has been considered impossible in the past especially when acid chlorides have been used in forming the monoester, since the excess acid chloride reacts to form anhydrides, etc., reducing the yield of monoester, and additionally the monoesters thus formed were readily decomposable at distillation temperatures. The present method, employing direct esterification with a fatty acid or preferably esterification by alcoholysis between an alkyl ester of a fatty acid and the blocked glycerin as stated above, permits high vacuum distillation of the monoester with the resultant purity of product lacking in the prior art methods. The groups protecting the hydroxyl may be removed by reduction in the presence of a catalyst, this method being desirable where migration of a fatty acid radical from the middle to an end carbon atom is undesirable. The blocking groups may also be removed by hydrolysis in the presence of dilute mineral acids. This latter method is desirable if alpha monoglycerides are desired, since under the conditions of acid hydrolysis any fatty acid present in the beta position tends to migrate to the alpha position.

It is believed that this invention will be more clearly set forth by the following specific examples which are presented for the purpose of illustration and are not intended to limit the present invention thereby:

*Example 1*

276 grams of glycerin, 90 grams of formaldehyde (added as a 40% aqueous solution), and 0.3 gram of concentrated sulphuric acid were mixed and heated to distill off the water. When the water had been removed, a vacuum was placed on the system and the glycerin formal distilled off at 90 to 95° C. and 20 mm. pressure. It was not necessary to neutralize the sulphuric acid used as a catalyst in order to obtain good yields of glycerin formal. In this experiment, 300 grams of glycerin formal were obtained (95% of theoretical). To prepare the ester of glycerin formal, 300 grams of the formal derivative were mixed with 540 grams of methyl palmitate and 3 grams of litharge (lead oxide). On heating to 190° C. interchange occurred and 60 grams of methanol (96.8% of theoretical) were distilled off. The palmityl ester of glycerin formal was then purified by distilling off excess glycerin formal at 95° C. and 10 mm. pressure and a small amount of unreacted methyl palmitate at 173° C. and 3 mm. pressure. The temperature was then raised to about 218° C. and the highly purified palmityl ester of glycerine formal, 708 grams, was distilled off at 3 mm. pressure. This ester was then freed of its blocking groups by heating in an autoclave with water at 105° C. for a period of 4 hours and then flashing-off the liberated formaldehyde and excess water. In this manner 633 grams of pure mono-palmitin were obtained.

*Example 2*

184 grams of glycerin were mixed with 92 grams of acetone and a stream of dry HCl passed through the mixture. At the end of 1 hour the acid flow was stopped, the acid neutralized, and the resulting acetone glycerol recovered by fractional distillation for a yield of 238 grams (90% of theoretical). 185 grams of the acetone glycerol were mixed with 298 grams of methyl stearate and 2 grams of litharge (lead oxide). On heating to 180-190° C., ester interchange occurred and methyl alcohol (30 grams or 94% of theoretical) distilled off. The temperature was then raised to remove any remaining unreacted acetone glycerol and methyl stearate, the purified stearyl ester of acetone glycerol being left in the still pot. For removal of the acetone group, 414 grams of the product were dissolved in 4 liters of fat solvent, e. g. ether, and stirred with 500 ml. of dilute sulphuric acid, the temperature being kept preferably under 30° C. The aqueous layer was then drawn off and the monostearin formed was recovered by chilling the ether solution and filtering. The yield of monostearin was 325 grams or 90.7% of theoretical based on the amount of methyl stearate used.

Unless a very high degree of purity is required, the monoester may be most easily recovered by merely evaporating off the ether solution after removal of any free acid.

*Example 3*

As an alternative method of preparing acetone glycerol, the following can be used:

100 grams of C. P. glycerin (95% glycerin), 300 cc. of acetone, and 300 cc. of petroleum ether (boiling point 35–55° C.) were mixed with 3 grams of para-toluene sulphonic acid and stirred with heating at refluxing temperature. Vapors leaving the solution entered a packed column topped by a total reflux phase-separating head. After 18 hours reaction, the mixture was neutralized with powdered, fused sodium acetate (1.3 grams) filtered, and the solvent evaporated. In this manner 125 grams of acetone glycerol were obtained. Boiling point—80.6° C. at 11 mm. pressure; refractive index—$n_D^{25}$ 1.4326; molecular refraction—$_D$32.30 calc. 32.43$_D$.

When carrying out this invention, if glycerin formal is used, it is best prepared according to Example 1. However, if acetone glycerol is used, it may be prepared according to Example 2 or 3, or by any other available method.

In all cases the glycerin containing the two blocked hydroxyl groups is converted into the fatty ester derivative, preferably by heating with the appropriate fatty acid ester in the presence of a soap catalyst, added as such or prepared "in situ."

The hydrolysis of the product formed by the esterification of the blocked hydroxyl derivative with a suitable esterification agent is accomplished either by autoclaving or in the presence of dilute mineral acid. Autoclaving would probably be preferred in commercial practice.

Examples 1 and 2 above are illustrative of the over-all process of this invention. However, as was mentioned previously, the removal of the blocking groups from the glycerin derivative may be accomplished by reduction as well as by hydrolysis. The above examples disclose the use of hydrolysis in effecting removal of the blocking groups, while the following example is illustrative of the use of reduction in effecting such removal:

*Example 4*

2 mols of glycerin were mixed with 2 mols of benzaldehyde and a stream of dry HCl passed through the mixture. At the end of 1 hour, the acid flow was stopped, the acid neutralized, and the resulting benzylidene glycerol recovered for a yield of about 90% of theoretical. The benzylidene glycerol was then mixed with methyl caproate and lead oxide catalyst and heated to 180°–190° C. to effect ester interchange. Methyl alcohol to the extent of about 94% of theoretical was distilled off and the temperature then raised to remove any remaining unreacted benzylidene glycerol and methyl caproate, the purified caproyl benzylidene glycerols being left in the still pot. 8.5 grams of the 2-caproyl-1,3-benzylidene glycerol, thus prepared, were dissolved in 100 cc. of absolute alcohol containing .5 gm. of palladium black catalyst. The mixture was placed in the hydrogenation bottle of a Burgess-Parr apparatus and the air evacuated. Reduction was carried out at room temperature with 36 pounds of hydrogen pressure. Reduction was complete in two hours. The catalyst was removed by filtration and the solvent removed by vacuum drying. On cooling to −20° C. the 2-monocaproin crystallized. It was washed at −20° C. with cold petroleum ether. The final product had a melting point of −8° to 10° C. Molecular weight 189.1 (calculated 190.24). Calculated for $C_9H_{18}O_4$ 56.62% carbon and 9.5% hydrogen. Found 56.48% carbon and 9.32% hydrogen.

The present invention possesses several advantages over previous processes for the production of monoglycerides. For example, the reaction products formed when the hydroxyl groups are blocked may be purified to any desired degree by fractional distillation. Further, the final product formed after removal of the blocking groups is a substantially pure monoglyceride, whereas the final products of the previous processes have contained relatively large quantities of di- and triglycerides as well as the desired monoglyceride. The final product produced by this synthesis may easily be purified because of the relative insolubility of the di- and triglycerides in polar solvents.

Obviously, many modifications and variations of the invention as hereinbefore set forth may be made without departing from the spirit and scope thereof, and therefore only such limitations should be imposed as are indicated in the appended claims.

I claim:

1. The process of producing substantially pure monoglycerides, which comprises reacting glycerin with an oxo-carbonyl compound whereby two of the hydroxyl groups of the glycerin are blocked, esterifying the resulting reaction product by reaction with an alkyl ester of a fatty acid, purifying the esterified reaction product by high vacuum distillation, and thereafter unblocking the blocked hydroxyl groups by removing the oxo-carbonyl compound to form a monoglyceride.

2. The process of producing substantially pure monoglycerides, which comprises reacting glycerin with an oxo-carbonyl compound whereby two of the hydroxyl groups of the glycerin are blocked by the carbonyl group of the oxo-carbonyl compound, esterifying the resulting reaction product by reaction with an alkyl ester of a fatty acid, purifying the esterified reaction product by high vacuum distillation, and thereafter freeing the blocked hydroxyl groups by hydrolysis of the purified esterified product to form a monoglyceride.

3. The process of producing substantially pure monoglycerides, which comprises reacting glycerin with an oxo-carbonyl compound, whereby two of the hydroxyl groups of the glycerin are blocked by the carbonyl group of the oxo-carbonyl compound, esterifying the resulting reaction product by reaction with an alkyl ester of a fatty acid, purifying the esterified reaction product by high vacuum distillation, and thereafter freeing the blocked hydroxyl groups by reduction of the purified esterified product to form a monoglyceride.

4. The process of producing substantially pure monoglycerides, which comprises reacting glycerin with an oxo-carbonyl compound, esterifying the resulting reaction product by reaction with a low molecular weight ester of a fatty acid, purifying the esterified reaction porduct by high vacuum distillation, and thereafter hydrolyzing the resulting purified esterified product to form a monoglyceride.

5. The process of producing substantially pure monoglycerides, which comprises reacting glycerin with an oxo-carbonyl compound, esterifying the resulting reaction product by reaction with a low molecular weight ester of a fatty acid, purifying the esterified reaction product by high vacuum distillation, and thereafter reducing the resulting purified esterified product to form a monoglyceride.

6. The process of producing substantially pure monoglycerides, which comprises reacting glycerin with an aldehyde, esterifying the resulting reaction product by reaction with an alkyl ester of a fatty acid, purifying the esterified reaction product by high vacuum distillation, and thereafter hydrolyzing the resulting purified esterified product to form a monoglyceride.

7. The process of producing substantially pure monoglycerides, which comprises reacting glycerin with an aldehyde, esterifying the resulting reaction product by reaction with an alkyl ester of a fatty acid, purifying the esterified reaction product by high vacuum distillation, and thereafter reducing the resulting purified esterified product to form a monoglyceride.

8. The process of producing a substantially pure monoglyceride, which comprises reacting glycerin with formaldehyde to form glycerin formal, esterifying the resulting glycerin formal by reaction with an alkyl ester of a fatty acid, purifying the resulting ester of glycerin formal by high vacuum distillation, and thereafter hydrolyzing the resulting purified ester of glycerin formal to form a monoglyceride.

9. The process of producing a substantially pure monoglyceride which comprises reacting glycerin with formaldehyde to form glycerin formal, esterifying the resulting glycerin formal by reaction with a low molecular weight ester of a fatty acid, purifying the ester of glycerin formal by high vacuum distillation, and thereafter hydrolyzing the resulting purified ester of glycerin formal to produce a monoglyceride.

10. The process of producing substantially pure monopalmitin, which comprises reacting glycerin with formaldehyde to form glycerin formal, esterifying the resulting glycerin formal with methyl palmitate to form the palmital ester of glycerin formal, purifying the said palmital ester of glycerin formal by high vacuum distillation, and thereafter hydrolyzing the resulting purified palmital ester of glycerin formal to form monopalmitin.

11. The process of producing substantially pure monocaproin, which comprises reacting glycerin with benzaldehyde to form 1,3-benzylidene glycerol, esterifying the resulting 1,3-benzylidene glycerol with methyl caproate to form 2-caproyl-1,3-benzylidene glycerol, purifying the said 2-caproyl-1,3-benzylidene glycerol by high vacuum distillation, and thereafter reducing the resulting purified 2-caproyl-1,3-benzylidene glycerol to form monocaproin.

12. The process of producing substantially pure monoglycerides, which comprises reacting glycerin with a ketone, esterifying the resulting reaction product by reaction with an alkyl ester of a fatty acid, purifying the esterified reaction product by high vacuum distillation, and thereafter hydrolyzing the resulting purified esterified product to form a monoglyceride.

13. The process of producing substantially pure monoglycerides, which comprises reacting glycerin with a ketone, esterifying the resulting reaction product by reaction with an alkyl ester of a fatty acid, purifying the esterified reaction product by high vacuum distillation, and thereafter reducing the resulting purified esterified product to form a monoglyceride.

14. The process of producing a substantially pure monoglyceride, which comprises reacting glycerin with acetone to form acetone glycerol, esterifying the resulting acetone glycerol by reaction with an alkyl ester of a fatty acid, purifying the resulting ester of acetone glycerol by high vacuum distillation, and thereafter hydrolyzing the resulting purified ester of acetone glycerol to form a monoglyceride.

15. The process of producing a substantially pure monoglyceride, which comprises reacting glycerin with acetone to form acetone glycerol, esterifying the resulting acetone glycerol by reaction with a low molecular weight ester of a fatty acid, purifying the resulting ester of acetone glycerol by high vacuum distillation, and thereafter hydrolyzing the resulting purified ester of acetone glycerol to form a monoglyceride.

16. The process of producing substantially pure monostearate, which comprises reacting glycerin with acetone to form acetone glycerol, esterifying the resulting acetone glycerol with methyl stearate to form the stearyl ester of acetone glycerol, purifying the said stearyl ester of acetone glycerol by high vacuum distillation, and thereafter hydrolyzing the resulting purified stearyl ester of acetone glycerol to form monostearate.

FRANK A. NORRIS.

REFERENCES CITED

The following references are of record in the file of this patent:

UNITED STATES PATENTS

| Number | Name | Date |
|---|---|---|
| 2,320,844 | Black | June 1, 1943 |
| 2,408,905 | Black | Oct. 8, 1946 |